(12) United States Patent
Layouni et al.

(10) Patent No.: US 12,335,732 B2
(45) Date of Patent: Jun. 17, 2025

(54) DETECTING SPOOFED ETHERNET FRAMES WITHIN AN AUTOSAR COMMUNICATION STACK

(71) Applicant: GM Global Technology Operations LLC, Detroit, MI (US)

(72) Inventors: Mohamed A. Layouni, Fraser, MI (US); Vinaya Rayapeta, Cedar Park, TX (US); Manohar Reddy Nanjundappa, Troy, MI (US); Thomas M. Forest, Macomb, MI (US); Karl Bernard Leboeuf, LaSalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 452 days.

(21) Appl. No.: 17/852,715

(22) Filed: Jun. 29, 2022

(65) Prior Publication Data

US 2024/0007859 A1 Jan. 4, 2024

(51) Int. Cl.
*H04W 12/106* (2021.01)
*G07C 5/00* (2006.01)
*H04W 12/104* (2021.01)

(52) U.S. Cl.
CPC .......... *H04W 12/106* (2021.01); *G07C 5/008* (2013.01); *H04W 12/104* (2021.01)

(58) Field of Classification Search
None
See application file for complete search history.

(56) References Cited

U.S. PATENT DOCUMENTS

| 2004/0083286 A1* | 4/2004 | Holden | H04L 63/126 709/225 |
| 2013/0103379 A1* | 4/2013 | Nam | G06F 8/30 703/22 |
| 2014/0337680 A1* | 11/2014 | Hwang | H04L 1/1809 714/748 |
| 2015/0067148 A1* | 3/2015 | Kim | H04L 67/12 709/224 |
| 2017/0013005 A1* | 1/2017 | Galula | H04L 63/1425 |
| 2019/0379556 A1* | 12/2019 | Okumura | H04L 43/028 |
| 2020/0274729 A1* | 8/2020 | Takada | H04L 9/3242 |
| 2021/0176259 A1 | 6/2021 | Park et al. | |

FOREIGN PATENT DOCUMENTS

| EP | 3697056 A1 * | 8/2020 | H04L 29/06 |
| WO | WO9306674 * | 4/1993 | H04L 12/18 |
| WO | WO2007041654 A2 * | 4/2007 | H04Q 7/00 |
| WO | WO2021004652 A1 * | 1/2021 | H04L 29/06 |

* cited by examiner

*Primary Examiner* — Paul R Fisher
(74) *Attorney, Agent, or Firm* — Vivacqua Crane, PLLC

(57) ABSTRACT

A system comprises a computer including a processor and a memory. The memory includes instructions such that the processor is programmed to: receive, at a device driver, an Ethernet frame from an Automotive Open System Architecture (AUTOSAR) communication stack, determine, at the device driver, whether the Ethernet frame is a spoofed Ethernet frame, and transmit a cancelation command to at least one layer of the AUTOSAR communication stack when the device driver determines the Ethernet frame is spoofed.

14 Claims, 7 Drawing Sheets

DETECTING SPOOFED ETHERNET FRAMES WITHIN AN AUTOSAR COMMUNICATION STACK

INTRODUCTION

The present disclosure relates to techniques for determining whether one or more Ethernet frames within an Automotive Open System Architecture (AUTOSAR) communication stack have been spoofed.

In recent years, development of automated driving systems has been promoted nationally, and almost all actuators provided in vehicles are subjected to electronic control. Controllers that control these actuators often have a software structure that complies with standards of Automotive Open System Architecture (AUTOSAR).

SUMMARY

A system comprises a computer including a processor and a memory. The memory includes instructions such that the processor is programmed to receive, at a device driver, an Ethernet frame from an Automotive Open System Architecture (AUTOSAR) communication stack, determine, at the device driver, whether the Ethernet frame is a spoofed Ethernet frame, and transmit a cancelation command to at least one layer of the AUTOSAR communication stack when the device driver determines the Ethernet frame is spoofed.

In other features, the processor is further programmed to extract, via the device driver, a source media access control (MAC) address from a header portion of the Ethernet frame.

In other features, the processor is further programmed to compare the source MAC address to one or more authorized MAC addresses.

In other features, the one or more authorized MAC addresses are stored in a data structure.

In other features, the data structure comprises an AUTOSAR Extensible Markup Language (XML) file.

In other features, the processor is further programmed to transmit the cancelation command to a protocol data unit (PDU) router module of the AUTOSAR communication stack.

In other features, the PDU router module is configured to propagate the cancelation command through the AUTOSAR communication stack.

In other features, the AUTOSAR communication stack includes an Ethernet interface module configured to receive the Ethernet frame.

In other features, the Ethernet interface module is configured to provide the Ethernet frame to the device driver.

A method includes receiving, at a device driver, an Ethernet frame from an Automotive Open System Architecture (AUTOSAR) communication stack, determining, at the device driver, whether the Ethernet frame is a spoofed Ethernet frame, and transmitting a cancelation command to at least one layer of the AUTOSAR communication stack when the device driver determines the Ethernet frame is spoofed.

In other features, the method includes extracting, via the device driver, a source media access control (MAC) address from a header portion of the Ethernet frame.

In other features, the method includes comparing the source MAC address to one or more authorized MAC addresses.

In other features, the one or more authorized MAC addresses are stored in a data structure.

In other features, the data structure comprises an AUTOSAR Extensible Markup Language (XML) file.

In other features, the method includes transmitting the cancelation command to a protocol data unit (PDU) router module of the AUTOSAR communication stack.

In other features, the PDU router module is configured to propagate the cancelation command through the AUTOSAR communication stack.

In other features, the AUTOSAR communication stack includes an Ethernet interface module configured to receive the Ethernet frame.

In other features, the Ethernet interface module is configured to provide the Ethernet frame to the device driver.

A system comprises a computer including a processor and a memory. The memory includes instructions such that the processor is programmed to receive, at a device driver, an Ethernet frame from an Automotive Open System Architecture (AUTOSAR) communication stack, extract, via the device driver, a source media access control (MAC) address from a header portion of the Ethernet frame, and append, via the device driver, the source MAC address to an authenticated Interaction Layer Protocol Data Unit (I-PDU) corresponding to the Ethernet frame, and the authenticated I-PDU is provided to a vehicle software application.

In other features, the authenticated I-PDU is authenticated by a secure onboard communication (SecOC) module in communication with the AUTOSAR communication stack.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes a system and a process that determines whether one or more Ethernet frames transmitted to an Automotive Open System Architecture (AU- TOSAR) communication stack have been spoofed. For example, a device driver can receive Ethernet frames transmitted to the AUTOSAR communication stack and determine whether the received Ethernet frames are spoofed based on a source media access control (MAC) address stored within a header of the received Ethernet frames. In various implementations, the device driver can interface with standard application programming interfaces (APIs) of the AUTOSAR communication stack.

Figure 1:
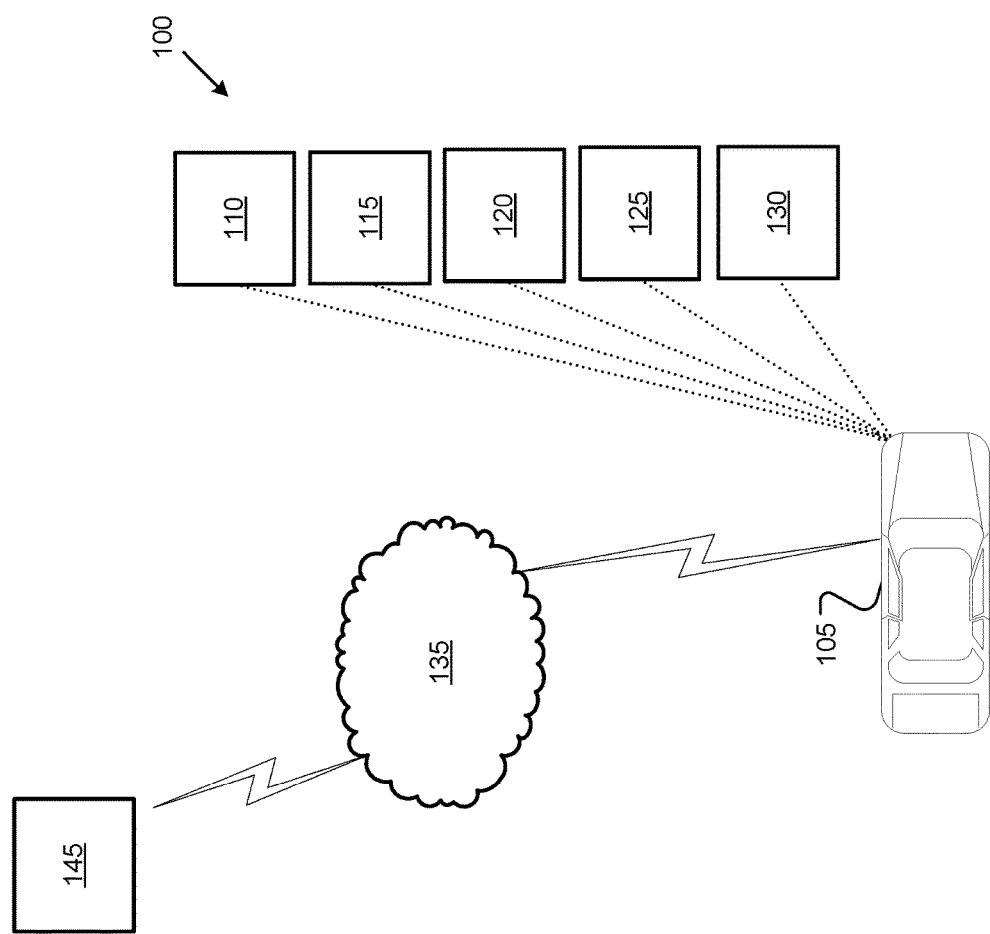
FIG. 1 is a block diagram of an example system including a vehicle.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

Figure 2:
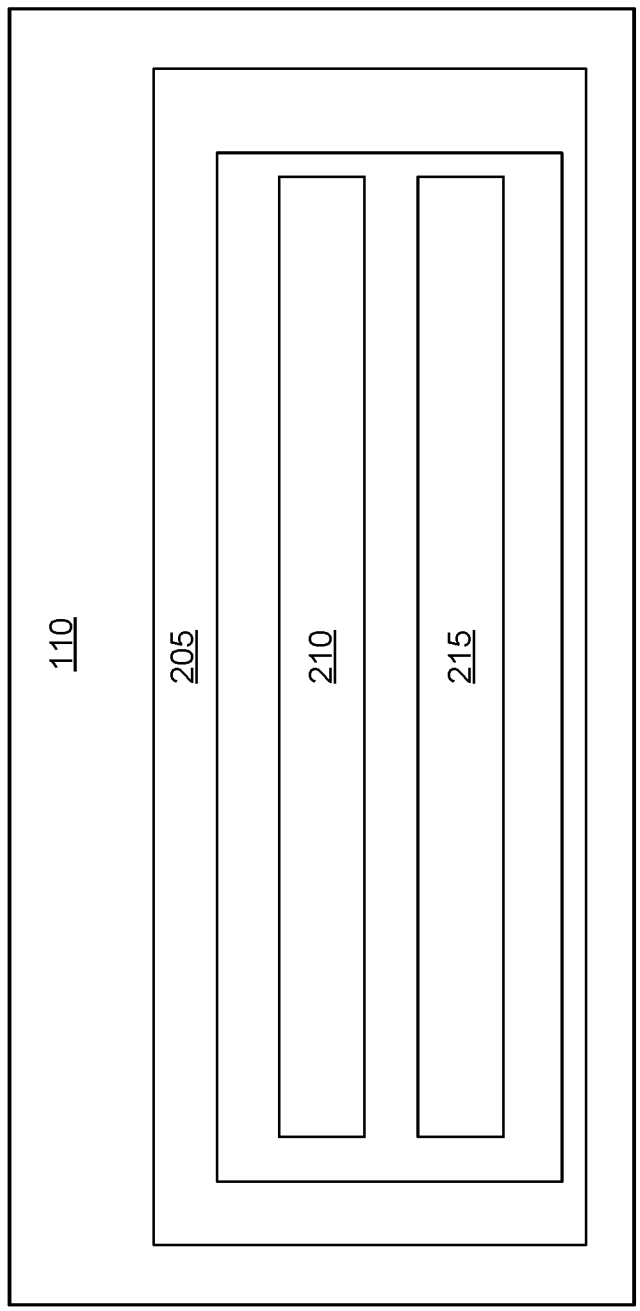
FIG. 2 is a block diagram of an example Ethernet frame spoof determination module.

FIG. 2 illustrates an example computer 110 that includes an Ethernet frame spoof determination module 205. As discussed herein, the packet spoof determination module 205 can detect spoofed Ethernet frames and prevent the spoofed Ethernet frames from reaching software applications. As shown, the spoof determination module 205 may include a device driver 210 and an Automotive Open System Architecture (AUTOSAR) communication stack 215, which is described in greater detail below.

Figure 3:
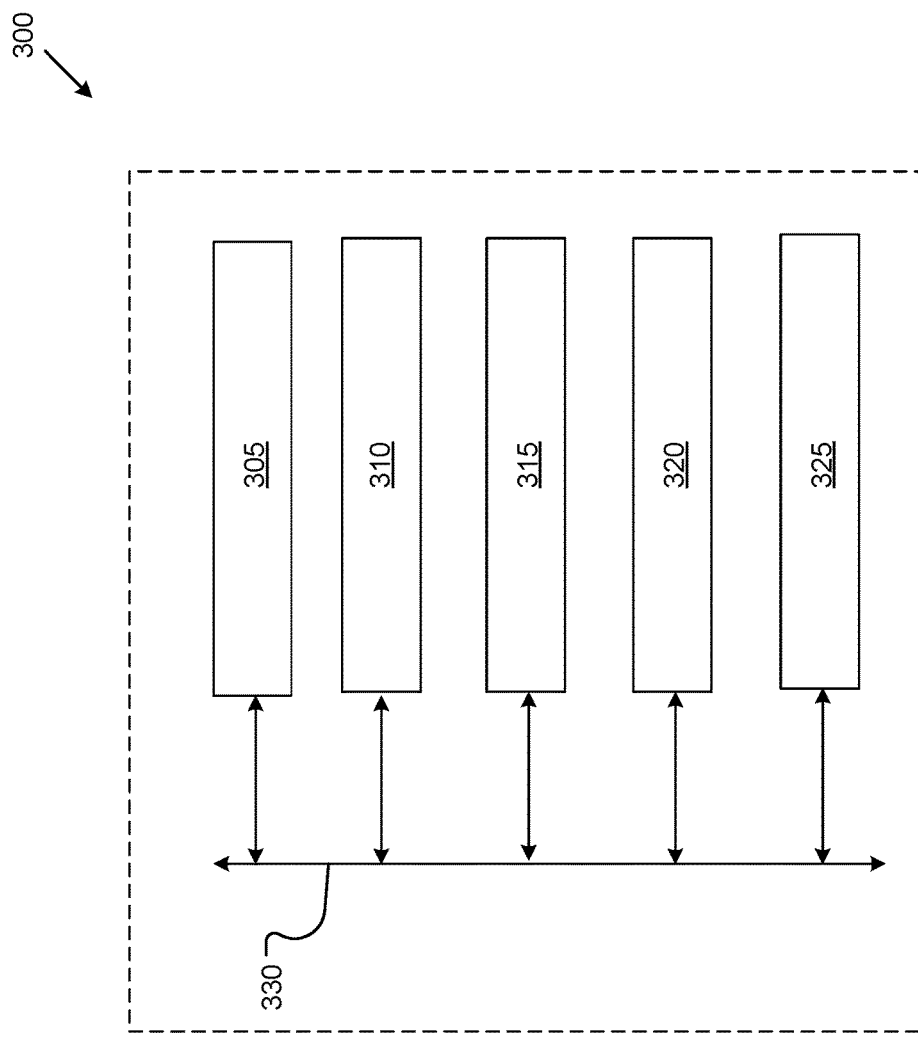
FIG. 3 is a block diagram of an example computing device.

FIG. 3 illustrates an example computing device 300, i.e., computer 110 and/or server(s) 145 that may be configured to perform one or more of the processes described herein. As shown, the computing device 300 can comprise a processor 305, memory 310, a storage device 315, an I/O interface 320, and a communication interface 325. Furthermore, the computing device 300 can include an input device such as a touchscreen, mouse, keyboard, etc. In certain implementations, the computing device 300 can include fewer or more components than those shown in FIG. 3.

In particular implementations, processor 305 includes hardware for executing instructions, such as those making up a computer program. As an example, and not by way of limitation, to execute instructions, processor 305 may retrieve (or fetch) the instructions from an internal register, an internal cache, memory 310, or a storage device 315 and decode and execute them.

The computing device 300 includes memory 310, which is coupled to the processor 305. The memory 310 may be used for storing data, metadata, and programs for execution by the processor(s). The memory 310 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 310 may be internal or distributed memory.

The computing device 300 includes a storage device 315 includes storage for storing data or instructions. As an example, and not by way of limitation, storage device 315 can comprise a non-transitory storage medium described above. The storage device 315 may include a hard disk drive (HDD), flash memory, a Universal Serial Bus (USB) drive or a combination of these or other storage devices.

The computing device 300 also includes one or more input or output ("I/O") devices/interfaces 320, which are provided to allow a user to provide input to (such as user strokes), receive output from, and otherwise transfer data to and from the computing device 300. These I/O devices/interfaces 320 may include a mouse, keypad or a keyboard, a touch screen, camera, optical scanner, network interface, modem, other known I/O devices or a combination of such I/O devices/interfaces 320. The touch screen may be activated with a writing device or a finger.

The I/O devices/interfaces 320 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 320 is configured to provide graphical data to a display for presentation to a user. The graphical data may be representative of one or more graphical user interfaces and/or any other graphical content as may serve a particular implementation.

The computing device 300 can further include a communication interface 325. The communication interface 325 can include hardware, software, or both. The communication interface 325 can provide one or more interfaces for communication (such as, for example, packet-based communication) between the computing device and one or more other computing devices 500 or one or more networks. As an example, and not by way of limitation, communication interface 325 may include a network interface controller (NIC) or network adapter for communicating with an Ethernet or other wire-based network or a wireless NIC (WNIC) or wireless adapter for communicating with a wireless network, such as a WI-FI. The computing device 300 can further include a bus 330. The bus 330 can comprise hardware, software, or both that couples components of computing device 300 to each other.

Figure 4:
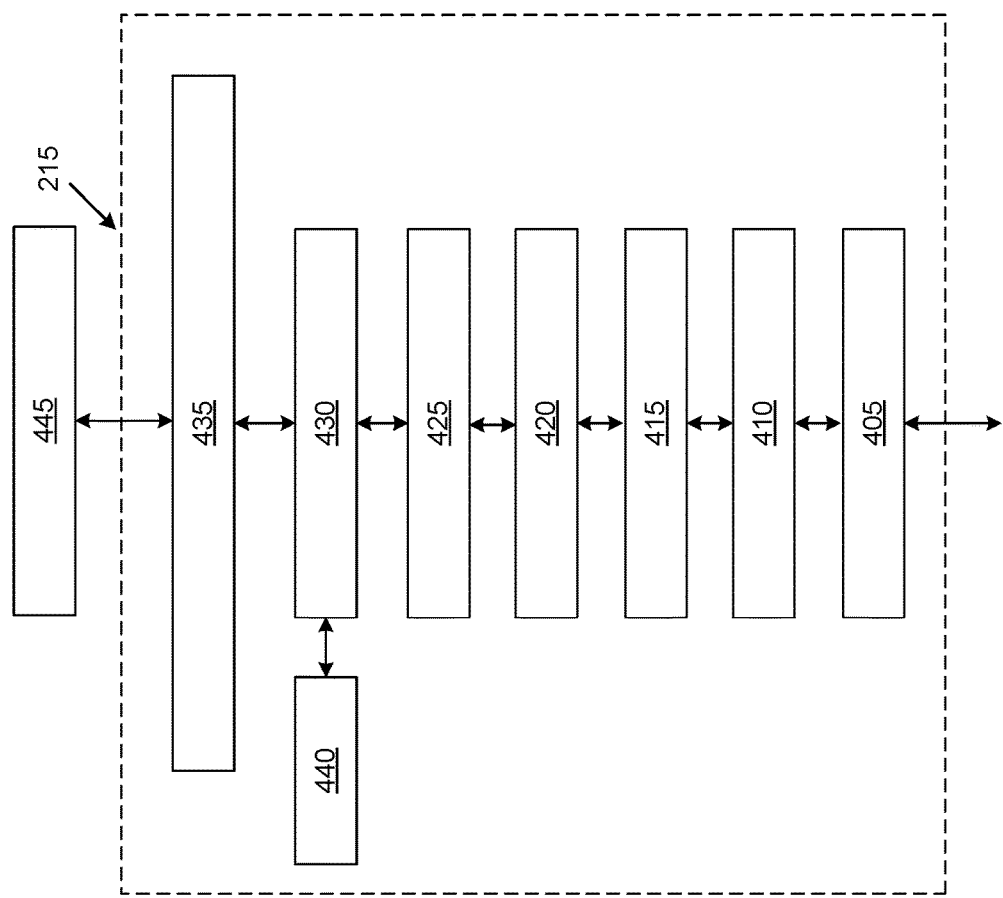
FIG. 4 is a diagrammatic illustration of example Automotive Open System Architecture (AUTOSAR) communication stack.

FIG. 4 illustrates an example implementation of the AUTOSAR communication stack 215. As shown, the AUTOSAR communication stack 215 includes an Ethernet interface module 405, a TCP/IP communication service module 410, a socket adapter module 415, a Diagnostics over IP (DoIP) module 420, a protocol data unit (PDU) router module 425, an AUTOSAR COM module 430, and a runtime environment 435. The AUTOSAR communication stack 215 can also include a secure onboard communication (SecOC) module 440.

The Ethernet interface module 405 is configured to receive and to transmit Ethernet frames via the communication network 135. The TCP/IP communication service module 410 provides network transmission functionality, i.e., TCP protocol, UDP protocol, to the AUTOSAR communication stack 215. The socket adapter module 415 is configured to provide interfaces and callbacks for socket connection establishment and/or notification. For example, the socket adapter module 415 can transmit and/or receive data via multiple socket connections.

The DoIP module 420 provides Diagnostics over Internet Protocol to facilitate automotive diagnostic services. The PDU router module 425 provides routing functionality for the protocol data unit (PDU). For example, the PDU router module 425 determines a destination of a PDU based on an associated identifier. The AUTOSAR COM module 430 provides an interface between the runtime environment 435 and the PDU router module 425. As shown, the runtime environment 435 can provide PDU data to a software application 445 for processing. The SecOC module 440 provides authentication data generation functionality for outgoing PDUs and authentication data verification functionality for received PDUs. For example, the SecOC module 440 can create a secure Interaction Layer Protocol Data Unit (I-PDU) by adding authentication data to outgoing I-PDUs. The authentication data can comprise a Message Authentication Code, e.g., an Authenticator.

Figure 5:
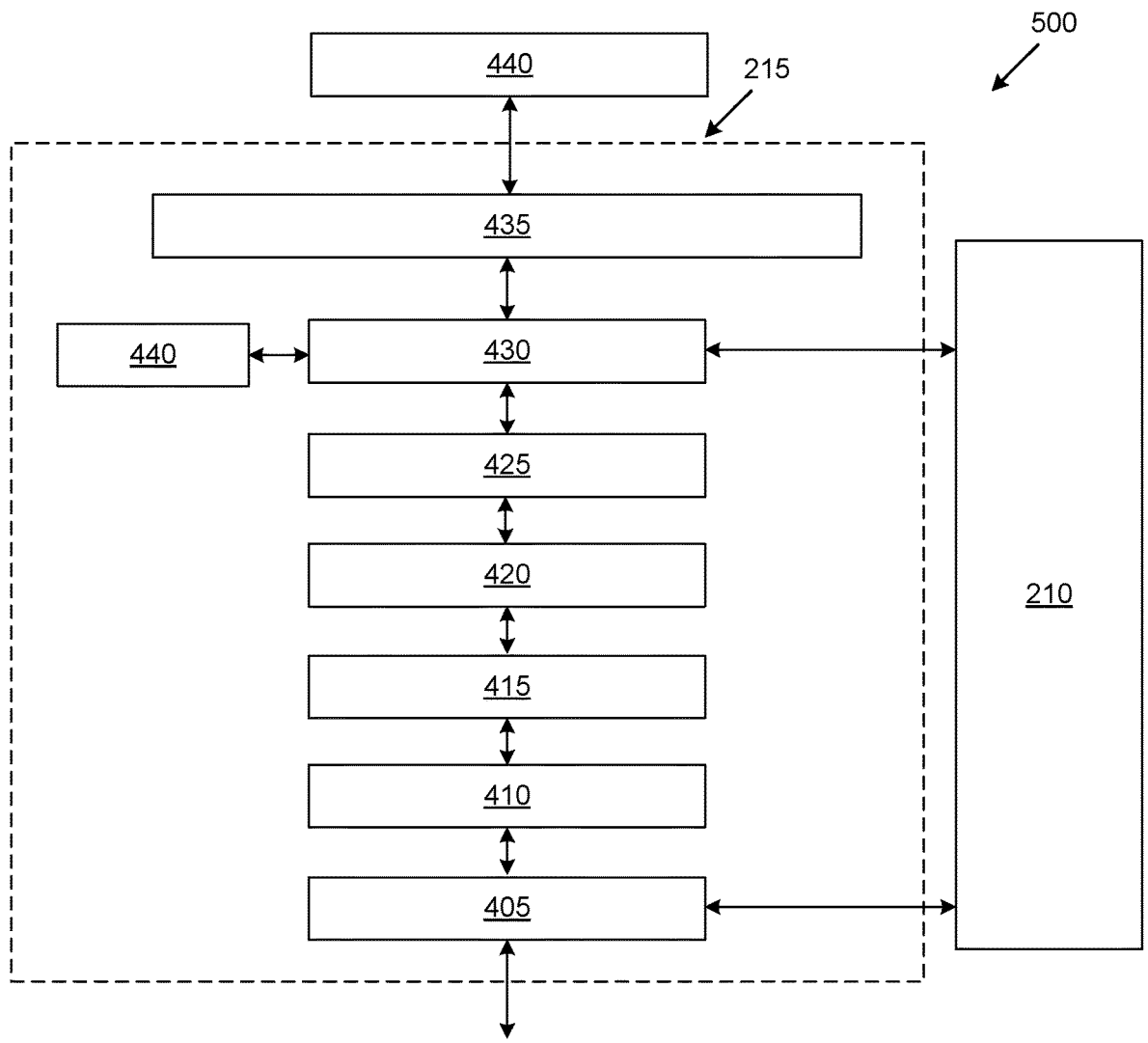
FIG. 5 is a block diagram of an example AUTOSAR communication stack in communication with a device driver that is configured to detect one or more spoofed Ethernet frames.
Figure 6:
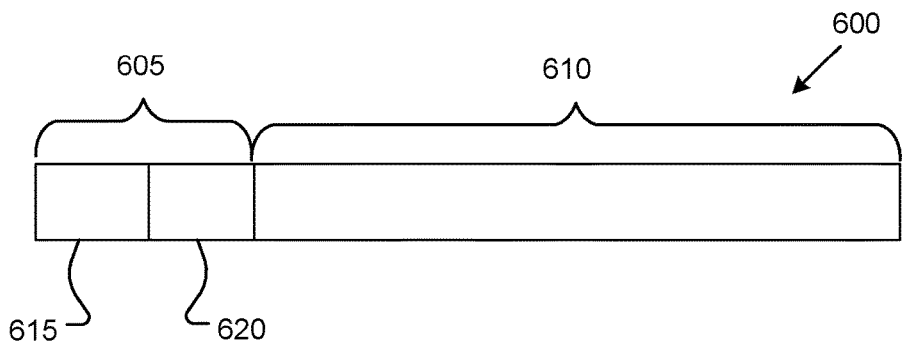
FIG. 6 is block diagram of an example Ethernet frame.

FIG. 5 illustrates an example environment 500 in which the device driver 210 is in communication with the AUTOSAR communication stack 215. The device driver 210 obtains Ethernet frames (see FIG. 6) that are received by the Ethernet interface module 405. FIG. 6 illustrates an example Ethernet frame 600, which includes a header portion 605 and a datagram portion 610. The header portion 605 can include a source media access control (MAC) address portion 615 and a destination MAC address portion 620. It is understood that the datagram portion 610 can include a data payload as well as data representing the source MAC address, the destination MAC address, a source IP address, and a destination IP address in various implementations.

Referring back to FIG. 5, in an example implementation, the device driver 210 extracts the source MAC address from the source MAC address portion 615. The device driver 210 compares the source MAC address to a list of source MAC addresses specifically authorized for the received I-PDU. For example, the device driver 210 can access a data structure, such as an AUTOSAR Extensible Markup Language (XML) file, that stores authorized MAC addresses.

If the extracted source MAC address is not contained in the list of source MAC addresses authorized for the received I-PDU, the device driver 210 identifies the Ethernet frame as spoofed and transmits a cancelation command. In an example implementation, the device driver 210 issues the cancelation command to the PDU router module 430. In this implementation, the cancelation command includes the PDU identifier corresponding to the spoofed Ethernet frame such that the PDU router module 430 can disregard the data associated with the Ethernet frame. The PDU router module 430 can further propagate the cancelation command through the AUTOSAR communication stack 215 such that the other modules of the AUTOSAR communication stack 215 can also disregard the data associated with the spoofed Ethernet frame.

In another example implementation, the datagram portion 610 of the Ethernet frame includes the source MAC address in addition to the data payload. Within this implementation, the datagram portion 610 includes a calculated message authentication code. The device driver 210 extracts the source MAC address from the source MAC address portion 615 and the source MAC address from the datagram portion 610. The device driver 210 then compares the source MAC address extracted from the source MAC address portion 615 to the source MAC address contained within the datagram portion 610. The device driver 210 then transmits a cancelation command indicating the Ethernet frame is spoofed when the comparison indicates the MAC addresses do not match.

In yet another example implementation, referring to FIG. 5, the device driver 210 records the source MAC address of incoming Ethernet frames. The PDU router module 430 can provide a secured I-PDU to the SecOC module 440 for authentication purposes. Once authenticated, the SecOC module 440 provides an authenticated I-PDU to the PDU router module 430. The PDU router module 430 provides the authenticated I-PDU to the device driver 210, and the device driver 210 appends the source MAC address to the authenticated I-PDU. The authenticated I-PDU having an appended source MAC address is provided to the PDU router module 430, and the PDU router module 430 provides the authenticated I-PDU having the appended source MAC address to the AUTOSAR COM module 430 for further processing.

Figure 7:
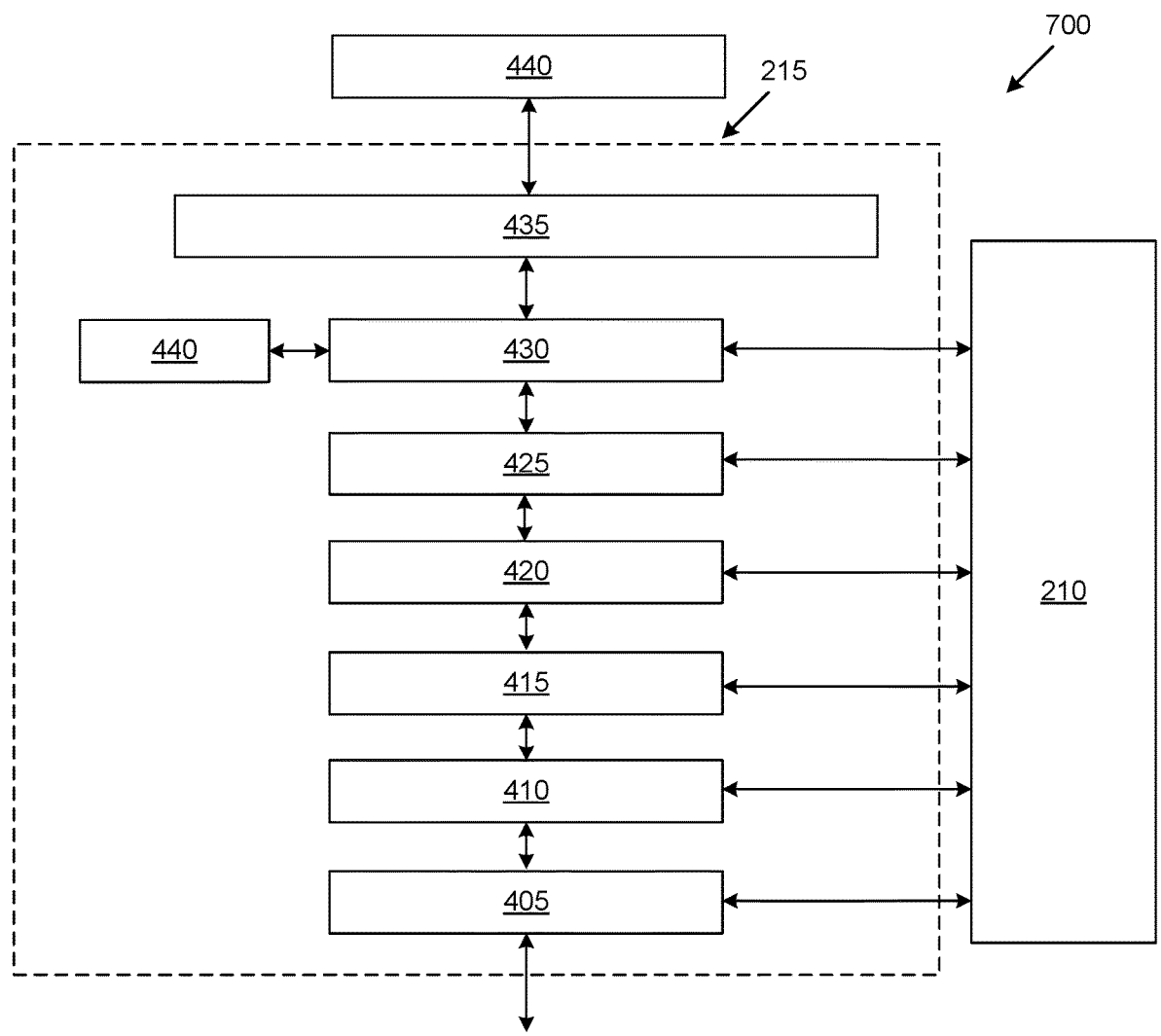
FIG. 7 is another block diagram of an example AUTOSAR communication stack in communication with the device driver that is configured to detect one or more spoofed Ethernet frames.

FIG. 7 illustrates an example environment 700 in which the device driver 210 is in communication with each module, i.e., layer, of the AUTOSAR communication stack 215. In this implementation, the device driver 210 can communicate with each layer such that if a spoofed Ethernet frame is detected, the device driver 210 can send the cancelation command to the layer, as well as any previous layers, that have processed data associated with the Ethernet frame.

In some instances, the SecOC module 440 can confirm a validity of a Message Authentication Code associated with the Ethernet frame. In these instances, the device driver 210 can forward the PDU associated with the Ethernet frame to the AUTOSAR COM module 430 and/or the runtime environment 435. As discussed above, the runtime environment 435 can then forward the PDU to the intended software application, e.g., software application 445.

Figure 8:
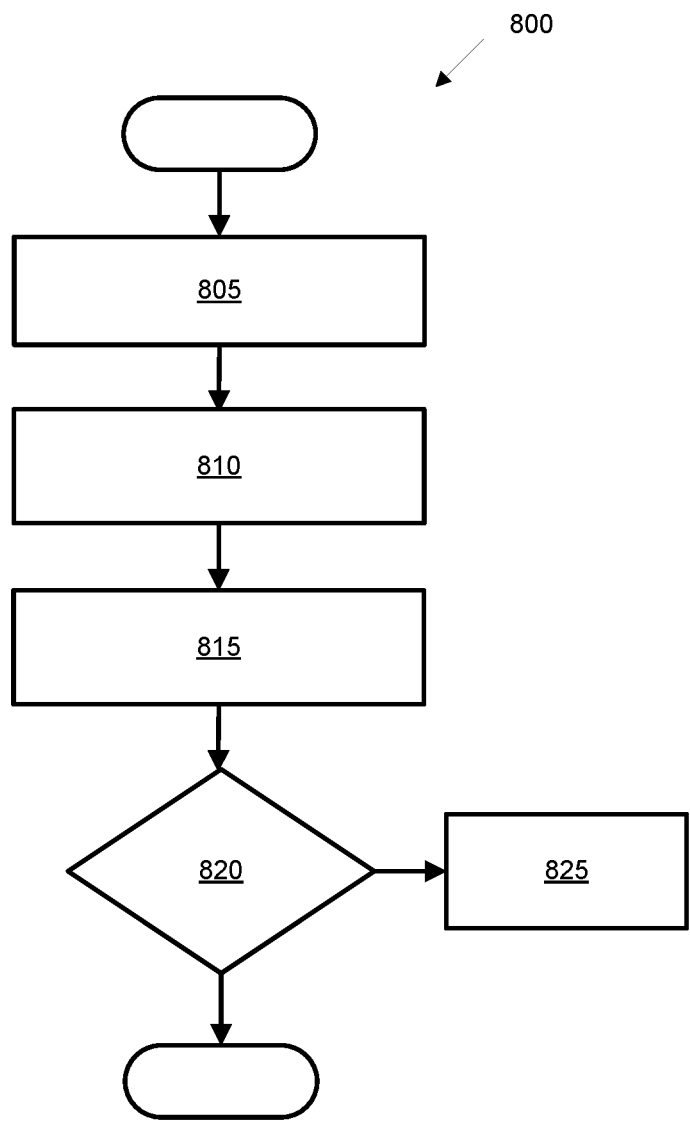
FIG. 8 is a flow diagram illustrating an example process for detecting one or more spoofed Ethernet frames.

FIG. 8 is a flowchart of an example process 800 for detecting one or more spoofed Ethernet frames according to the techniques described herein. Blocks of the process 800 can be executed by the computer 110. The process 800 begins at block 805 in which an Ethernet frame is received at a AUTOSAR communication stack 215. At block 810, the device driver 210 receives the Ethernet frame from the AUTOSAR communication stack 215. For example, the device driver 210 can be in communication with the Ethernet interface module 405.

At block 815, the device driver 210 extracts the source MAC address from the source MAC address portion 615. At block 820, the device driver 210 determines whether the Ethernet frame is spoofed. For example, the device driver 210 can compare the source MAC address with authorized MAC addresses stored in a ARXML file. In another example, the device driver 210 can compare the source MAC address with a source MAC address obtained from the datagram portion 610 of the Ethernet frame.

If the device driver 210 determines the Ethernet frame is spoofed, the device driver 210 sends a cancelation command to one or more layers of the AUTOSAR communication stack 215 to cause the data, i.e., PDU, etc., to be dropped from the AUTOSAR communication stack 215 at block 825. Otherwise, the process 800 ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
    receive, at a device driver, an Ethernet frame from an Automotive Open System Architecture (AUTOSAR) communication stack;
    determine, at the device driver, whether the Ethernet frame is a spoofed Ethernet frame by:
        extracting, via the device driver, a source media access control (MAC) address from a source MAC address portion of the Ethernet frame;
        extracting, via the device driver, the source MAC address from a datagram portion of the Ethernet frame; and
        comparing the source MAC address extracted from the source MAC address portion with the source MAC address extracted from the datagram portion,
        wherein the ethernet frame is spoofed when the source MAC address extracted from the source MAC address portion does not match the source MAC address extracted from the datagram portion; and transmit a cancelation command to at least one layer of the AUTOSAR communication stack when the device driver determines the Ethernet frame is spoofed.

2. The system of claim 1, wherein one or more authorized MAC addresses are stored in a data structure.

3. The system of claim 2, wherein the data structure comprises an AUTOSAR Extensible Markup Language (XML) file.

4. The system of claim 1, wherein the processor is further programmed to transmit the cancelation command to a protocol data unit (PDU) router module of the AUTOSAR communication stack.

5. The system of claim 4, wherein the PDU router module is configured to propagate the cancelation command through the AUTOSAR communication stack.

6. The system of claim 1, wherein the AUTOSAR communication stack includes an Ethernet interface module configured to receive the Ethernet frame.

7. The system of claim 6, wherein the Ethernet interface module is configured to provide the Ethernet frame to the device driver.

8. A method comprising:
receiving, at a device driver, an Ethernet frame from an Automotive Open System Architecture (AUTOSAR) communication stack;
determining, at the device driver, whether the Ethernet frame is a spoofed Ethernet frame by:
extracting, via the device driver, a source media access control MAC) address from a source MAC address portion of the Ethernet frame;
extracting, via the device driver, the source MAC address from a datagram portion of the Ethernet frame; and
comparing the source MAC address extracted from the source MAC address portion with the source MAC address extracted from the datagram portion,
wherein the ethernet frame is spoofed when the source MAC address extracted from the source MAC address portion does not match the source MAC address extracted from the datagram portion; and
transmitting a cancelation command to at least one layer of the AUTOSAR communication stack when the device driver determines the Ethernet frame is spoofed.

9. The method of claim 8, wherein one or more authorized MAC addresses are stored in a data structure.

10. The method of claim 9, wherein the data structure comprises an AUTOSAR Extensible Markup Language (XML) file.

11. The method of claim 8, the method further comprising: transmitting the cancelation command to a protocol data unit (PDU) router module of the AUTOSAR communication stack.

12. The method of claim 11, wherein the PDU router module is configured to propagate the cancelation command through the AUTOSAR communication stack.

13. The method of claim 8, wherein the AUTOSAR communication stack includes an Ethernet interface module configured to receive the Ethernet frame.

14. The method of claim 13, wherein the Ethernet interface module is configured to provide the Ethernet frame to the device driver.

* * * * *